United States Patent
Liang et al.

(10) Patent No.: US 7,167,526 B2
(45) Date of Patent: Jan. 23, 2007

(54) WIRELESS COMMUNICATION APPARATUS AND METHOD

(75) Inventors: Ying-Chang Liang, Singapore (SG); Francois Po Shin Chin, Singapore (SG)

(73) Assignee: National Univ. of Singapore, Singapore (SG)

( * ) Notice: Subject to any disclaimer, the term of this patent is extended or adjusted under 35 U.S.C. 154(b) by 799 days.

(21) Appl. No.: 10/054,543

(22) Filed: Jan. 18, 2002

(65) Prior Publication Data

US 2004/0071222 A1   Apr. 15, 2004

Related U.S. Application Data

(63) Continuation-in-part of application No. 09/877,929, filed on Jun. 7, 2001.

(51) Int. Cl.
H04B 7/02 (2006.01)
H04B 1/00 (2006.01)

(52) U.S. Cl. ............... 375/267; 375/148; 455/69
(58) Field of Classification Search ............ 375/310, 375/299, 267; 325/148–267; 455/69
See application file for complete search history.

(56) References Cited

U.S. PATENT DOCUMENTS

| | | | |
|---|---|---|---|
| 5,642,353 A * | 6/1997 | Roy et al. | 370/329 |
| 5,828,658 A * | 10/1998 | Ottersten et al. | 370/310 |
| 6,351,499 B1 * | 2/2002 | Paulraj et al. | 375/267 |
| 6,650,881 B1 * | 11/2003 | Dogan | 455/276.1 |
| 6,754,286 B2 * | 6/2004 | Hottinen et al. | 375/299 |
| 6,839,379 B1 * | 1/2005 | Horng et al. | 375/148 |
| 2003/0026349 A1 * | 2/2003 | Onggosanusi et al. | 375/267 |
| 2003/0035490 A1 * | 2/2003 | Gollamudi | 375/267 |
| 2004/0147227 A1 * | 7/2004 | Hamalainen et al. | 455/69 |

OTHER PUBLICATIONS

Pre-equalization technique for interference cancellation in the UMTS-TDD downlink channel;Morgado, A.; Pinho, P.; Gameiro, A.; Fernandes, J.;Vehicular Technology Conference, 2001. VTC 2001 Fall. IEEE VTS 54th , vol. 2, 7-11;2001 pp. 878-881.*
Sampath, H.; Bolcskei, H.; Paulraj, A.J.;Vehicular Technology Conference, 2000. IEEE VTS-Fall VTC 2000. 52nd , vol. 3, Sep. 24-28, 2000;pp. 1175-1178 vol. 3.*

* cited by examiner

*Primary Examiner*—Khai Tran
*Assistant Examiner*—Cicely Ware
(74) *Attorney, Agent, or Firm*—ipsolon llp

(57) ABSTRACT

A method and apparatus for achieving combined beamforming and transmit diversity for frequency selective fading channels in a communication system having a base station with multiple transmit antennae and a mobile terminal with at least a single receive antenna, the method comprising the steps of: providing a signal to be transmitted; space-time encoding the signal to produce at least two separate signals, each on a respective output; feeding each output signal to a multiple access transmit processor to produce an output signal; applying respective selected transmit beamforming weights to each output signal; feeding the respective weighted signals to a signal combiner to perform a summing function of the signals and produce a signal for transmission; feeding the summed signal to each of the multiple transmit antennae for transmission; transmitting the signals over respective physical channels; receiving the transmitted signal at at least a single receive antenna; feeding the transmitted signal to a multiple access receive processor to produce an output signal; and space-time decoding the received signal.

35 Claims, 8 Drawing Sheets

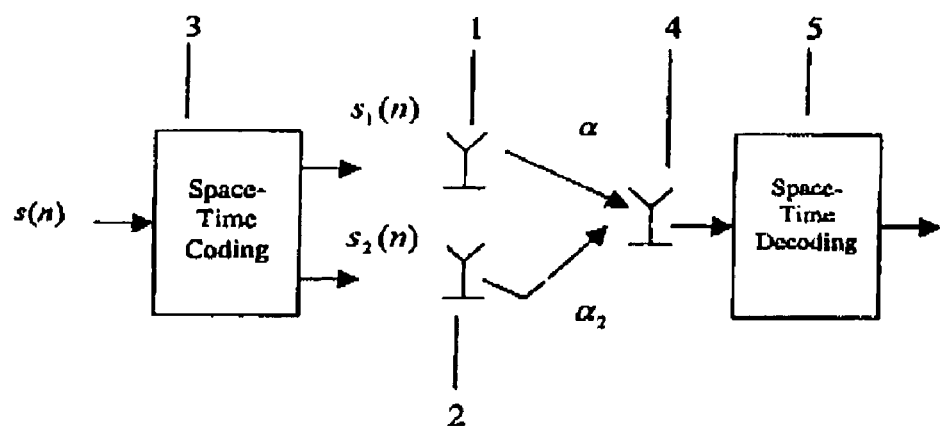
Figure 1: Prior Art
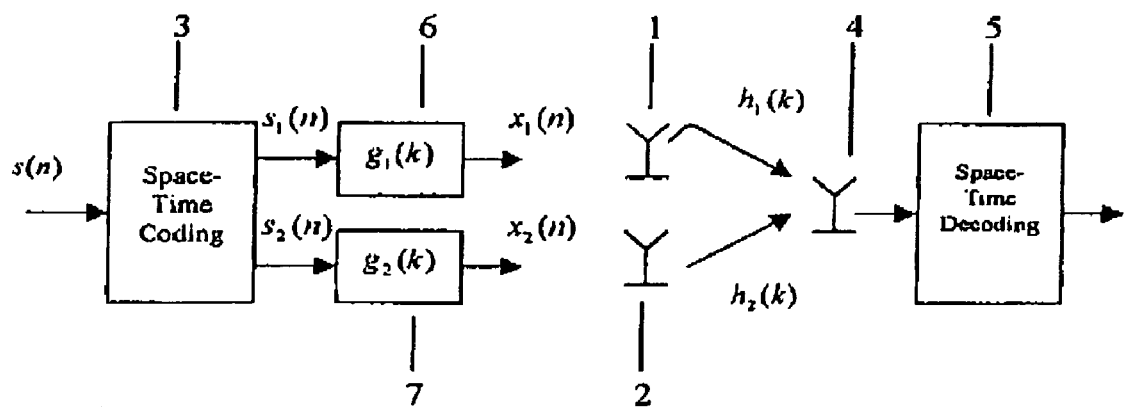
Figure 2

WIRELESS COMMUNICATION APPARATUS AND METHOD

BACKGROUND OF THE INVENTION

The present invention relates in general to wireless communication systems and, more particularly, to improving the downlink performance of wireless communication systems.

Wireless mobile communications suffer from four major impairments: path loss, multipath fading, inter-symbol interference (ISI) and co-channel interference. Adaptive antennas can be used to suppress the effects of these factors to improve the performance of wireless communication systems. There are two types of adaptive antennas: diversity antennas and beamforming antennas. In a diversity antenna system, multiple low-correlation or independent fading channels are acquired in order to compensate multipath fading, thus achieving diversity gain. Beamforming antennas, on the other hand, provide beamforming gain by making use of spatial directivity, thus compensating for path loss to a certain extent and suppressing co-channel interference.

In a diversity antenna system, the antenna spacing is usually required to be large enough, e.g., $10\lambda$ in order to obtain low-correlation/independent fading channels, especially for small angular spread environments. However, beamforming antennas need to achieve spatial directivity, so the signals received at and/or transmitted from all antennas must be correlated. This means that for beamforming antenna, the antenna spacing should usually be small, e.g. half wavelength for a uniform linear array (ULA). Because of the conflict between the required antenna spacings for diversity antenna systems and beamforming systems, a prejudice exists that diversity gain and beamforming gain cannot be achieved simultaneously.

SUMMARY OF THE INVENTION

It is an object of the present invention to seek to provide a wireless communication system benefiting simultaneously from both diversity gain and beamforming gain.

Accordingly, one aspect of the present invention provides a method of achieving transmit diversity gain in a communication system having a base station with multiple transmit antennae and a mobile terminal with a single receive antenna, the method comprising the steps of: providing a signal to be transmitted $s(n)$; space-time encoding the signal $s(n)$ to produce at least two separate signals $s_1(n), s_2(n)$, each on a respective output; feeding each output signal $s_1(n), s_2(n)$ to a zero-forcing pre-equaliser having a respective function $g_1(k), g_2(k)$ to produce an output signal $x_1(n), x_2(n)$; feeding the output signal $x_1(n), x_2(n)$ of each pre-equaliser to a transmit antenna; transmitting the output signals $x_1(n), x_2(n)$ over respective physical channels $h_1(k), h_2(k)$; receiving the output signals $x_1(n), x_2(n)$ at a single receive antenna; and space-time decoding the received signals, wherein the functions $g_1(k), g_2(k)$ of the zero-forcing pre-equalisers are selected such that the channel responses $g_1(k)*h_1(k), g_2(k)*h_2(k)$ of the respective physical channels $h_1(k), h_2(k)$ are flat fading channels.

Preferably, the communications system is a time-division duplex system and the method includes the further step of deriving the real channel coefficients from uplink channel coefficients for use in selecting the functions $g_1(k), g_2(k)$ of the pre-equalisers.

Conveniently, the step of deriving the real channel coefficients from uplink channel coefficients uses training symbols from the uplink channel.

Advantageously, the step of deriving the real channel coefficients from uplink channel coefficients uses blind techniques.

Preferably, the communications system is a frequency-division duplex system and the method includes the further step of deriving the real channel coefficients by sending a set of training symbols to the receive antenna of the mobile terminal, the mobile terminal estimating the real channel coefficients and feeding back channel coefficient information to the base station.

Another aspect of the present invention provides a base station with multiple transmit antennae for communicating with a mobile terminal having a single receive antenna over physical channels $h_1(k), h_2(k)$, the base station comprising: a space-time encoder having an input of a signal to be transmitted $s(n)$ and at least two outputs each producing a separate signal $s_1(n), s_2(n)$; at least two zero-forcing pre-equalisers, each fed by a respective output signal $s_1(n), s_2(n)$ and having a respective function $g_1(k), g_2(k)$ to produce an output signal $x_1(n), x_2(n)$; and at least two transmit antennae, each being fed by the output signal $x_1(n), x_2(n)$ of a respective one of the pre-equalisers, wherein the functions $g_1(k), g_2(k)$ of the zero-forcing pre-equalisers are selected such that the channel responses $g_1(k)*h_1(k), g_2(k)*h_2(k)$ of the respective physical channels $h_1(k), h_2(k)$ are flat fading channels.

Preferably, the mobile terminal has a single receive antenna and a space-time decoder to decode the signals received from the base station.

A further aspect of the present invention provides a method of achieving combined beamforming and transmit diversity for frequency selective fading channels in a communication system having a base station with multiple transmit antennae and a mobile terminal with a single receive antenna, the method comprising the steps of: providing a signal to be transmitted $S(n;k)$; space-time encoding the signal $S(n;k)$ to produce at least two separate signals $S_1(n;k), S_2(n;k)$, each on a respective output; feeding each output signal $S_1(n;k), S_2(n;k)$ to a transmit processor to produce an output signal $X_1(n;k), X_2(n;k)$; applying respective selected transmit beamforming weights to each output signal $X_1(n;k), X_2(n;k)$; feeding the respective weighted signals to a signal combiner to perform a summing function of the signals and produce a signal $X(n;k)$ for transmission; feeding the summed signal $X(n;k)$ to each of the multiple transmit antennae for transmission; transmitting the signals $X(n;k)$ over respective the physical channel $h(n;k)$; receiving the received signal $Y(n;k)$ at a single receive antenna; feeding the received signal $Y(n;k)$ to a receive processor to produce an output signal; and space-time decoding the received signal.

Preferably, the respective transmit beamforming weights are selected as the eigenvectors corresponding to the two largest eigenvalues of the downlink channel covariance matrix (DCCM) of the physical channel $h(n;k)$.

Conveniently, the physical channel $h(n;k)$ consists of two time-delayed rays, $h_1(n;k)$ and $h_2(n;k)$, and the transmit processors do not add cyclic prefixes and one of the output signals from the transmit processors is delayed by $\Delta\tau$ before the respective selected transmit beamforming weight is applied thereto, the beamforming weights being chosen such that the delayed signal or its inverse fast Fourier transform (IFFT) only goes through one channel $h_1(n;k)$ between the base station multiple transmit antennae and the receive antenna, whilst the undelayed signal or its IFFT only goes through another channel $h_2(n;k)$ between the base station multiple transmit antennae and the receive antenna, thereby creating two different channels which can be space-time decoded to recover the transmitted signal.

Advantageously, the physical channel h(n;k) consists of two time-delayed clustered rays, $h_1(n;k)$ and $h_2(n;k)$, the transmit processors have a cyclic prefix length of $\Delta\psi$ and one of the output signals from the transmit processors is delayed by $\psi$ before the respective selected transmit beamforming weight is applied thereto, the beamforming weights being chosen such that the delayed signal or its inverse fast Fourier transform (IFFT) only goes through one channel $h_1(n;k)$ between the base station multiple transmit antennae and the receive antenna, whilst the undelayed signal or its IFFT only goes through another channel $h_2(n;k)$ between the base station multiple transmit antennae and the receive antenna, thereby creating two different channels which can be space-time decoded to recover the transmitted signal.

Preferably, the method comprises the further steps of: estimating a power-delay-DOA profile for the channel h(n; k); and, based on the profile: determining the cyclic prefix length, $\Delta\psi$, to be added by the transmit processors; determining the delay $\psi$; and determining the transmit beamforming weights.

Advantageously, the method comprises the further step of estimating the downlink channel covariance matrix (DCCM) from the uplink channel covariance matrix (UCCM) to construct transmit beamforming weights.

Conveniently, the method comprises the further steps of: estimating the downlink channel covariance matrix (DCCM) from the uplink channel covariance matrix (UCCM) to construct transmit beamforming weights; estimating a power-delay-DOA profile for channel h(n;k); and, based on the profile: determining the length, $\Delta\psi$, of the cyclic prefix to be added by the transmit processors; determining the delay $\psi$; and determining the transmit beamforming weights.

A further aspect of the present invention provides a base station with multiple transmit antennae for communicating with a mobile terminal having a single receive antenna over physical channel h(n;k) having two time-delayed rays, $h_1(n;k)$ and $h_2(n;k)$, the base station comprising:

a space-time encoder having an input of a signal to be transmitted and at least two outputs each producing a separate signal; at least two transmit processors each receiving one of the outputs from a respective space-time encoder; at least two transmit beamformers each receiving an output from a respective transmit processor and applying a transmit beamforming weight thereto; a signal combiner receiving signals from the beamformers and operable to perform a summing function of the signals from the beamformers and produce a signal for transmission by the multiple transmit antennae.

Preferably, a delay of $\Delta\tau$ is interposed between one of the transmit processor outputs and a beamformer to delay the signal output from the transmit processor by $\Delta\tau$ before the respective selected transmit beamforming weight is applied thereto, wherein the transmit processors do not add cyclic prefixes.

Conveniently, a delay of $\psi$ is interposed between one of the transmit processor outputs and a beamformer to delay the signal output from the transmit processor by $\psi$ before the respective selected transmit beamforming weight is applied thereto, the transmit processors having a cyclic prefix length of $\Delta\psi$.

Advantageously, a processor to determine a power-delay-DOA profile estimate for channel h(n;k) is provided and, based on the profile, determine: the length, $\Delta\psi$, cyclic prefix to be added by the transmit processors; the delay $\psi$; and the transmit beamforming weights.

Conveniently, a processor is provided to estimate a downlink channel covariance matrix (DCCM) from the uplink channel covariance matrix (UCCM) to construct transmit beamforming weights.

Preferably, the base station further comprises a first processor to determine a power-delay-DOA profile estimate for channel h(n;k); and, based on the profile, determine: the length, $\Delta\psi$, of the cyclic prefix to be added by the transmit processors; the delay $\psi$; and the transmit beamforming weights; and a second processor to estimate a downlink channel covariance matrix (DCCM) from the uplink channel covariance matrix (UCCM) to construct transmit beamforming weights.

Conveniently, the transmit and receive processors are selected from the group consisting of: OFDM, CDMA and TDMA processors.

Advantageously, the communications system comprises the base station and a mobile terminal having a single receive antenna, a receive processor to produce an output signal and a space-time decoder to decode the output signal.

A further aspect of the present invention provides a method of achieving combined beamforming and transmit diversity for frequency selective fading channels in a communication system having a base station with multiple transmit antennae and a mobile terminal with a single receive antenna, the method comprising the steps of: providing a signal to be transmitted s(n); space-time encoding a signal to be transmitted s(n) to produce at least two separate signals $s_1(n),s_2(n)$, each on a respective output; delaying one of the space-time encoded output signals by $\Delta\tau$; applying respective selected transmit beamforming weights to the delayed and undelayed signals; feeding the respective weighted signals to a signal combiner to perform a summing function of the signals and produce a signal for transmission; feeding the summed signal to each of the multiple transmit antennae for transmission; transmitting the summed signals over the physical channel h(k) with two time-delayed rays $h_1(k)$, $h_2(k)$; receiving the major components of the transmitted signals at a single receive antenna at substantially the same time; and space-time decoding the received signal.

Preferably, the beamforming weights are chosen such that the delayed signal only goes through one ray $h_1(k)$ between the base station multiple transmit antennae and the receive antenna, whilst the undelayed signal only goes through another ray $h_2(k)$ between the base station multiple transmit antennae and the receive antenna.

Conveniently, the delay $\Delta\tau$ is derived from downlink channel information.

A further aspect of the present invention provides a base station with multiple transmit antennae for communicating with a mobile terminal having a single receive antenna over physical channel h(k) having two time-delayed rays $h_1(k)$, $h_2(k)$, the base station comprising:

a space-time encoder having an input of a signal to be transmitted and at least two outputs each producing a separate signal; at least two transmit beamformers each receiving an output from the space-time encoder and applying a transmit beamforming weight thereto; a signal combiner receiving signals from the beamformers and operable to perform a summing function of the signals from the beamformers and produce a signal for transmission by each of the multiple transmit antennae, wherein a delay of $\Delta\tau$ is interposed between the space-time encoder and one of the beamformers such that the major components of the transmitted signals are received at a single receive antenna at substantially the same time.

Preferably, the communications system comprises the base station and a mobile terminal having a single receive antenna and a space-time decoder to decode the received signal.

One aim of the present invention is to seek to achieve, at the mobile terminal, diversity gain, beamforming gain as well as delay spread reduction simultaneously by using a base station with a multiple antenna array.

The advantages of the embodiments of the present invention are as follows:

Beamforming gain and transmit diversity are achieved simultaneously;

Based on power-delay-DOA profile, delay spread is reduced adaptively.

In two-ray environment, a frequency selective fading channel is transferred into a flat fading channel, yet the path diversity gain is maintained.

In hilly terrain (HT) environment, we can transfer a long delay spread channel into a short delay spread channel, yet still maintain the path diversity gain.

With delay spread reduction and combined beamforming and transmit diversity, the invented systems provide high spectrum efficiency, yet consumes less transmission power.

The invented systems also employ adaptive modulation to further improve the spectrum efficiency based on the diversity order and channel conditions.

The mobile terminal is usually limited by physical size and battery power. The invented systems put the complicated processing at the base station, rather than at the mobile terminal. Thus the mobile terminal complexity is reduced.

The invented systems are well applicable for the applications which require high data rate for downlink transmission. These applications include, for example, high speed downlink packet access (HSDPA) in $3^{rd}$ generation partnership project (3GPP), wireless internet, and wireless multimedia communications.

BRIEF DESCRIPTION OF THE DRAWINGS

In order that the present invention may be more readily understood, embodiments thereof will now be described, by way of example, with reference to the accompanying drawings, in which:

FIG. 1 (Prior Art) is a schematic diagram illustrating Alamouti's permutation transmit diversity method;

FIG. 2 is a schematic diagram illustrating a method embodying the present invention using transmit diversity with pre-equalization for frequency selective fading channels;

DETAILED DESCRIPTION OF THE INVENTION

Figure 3:
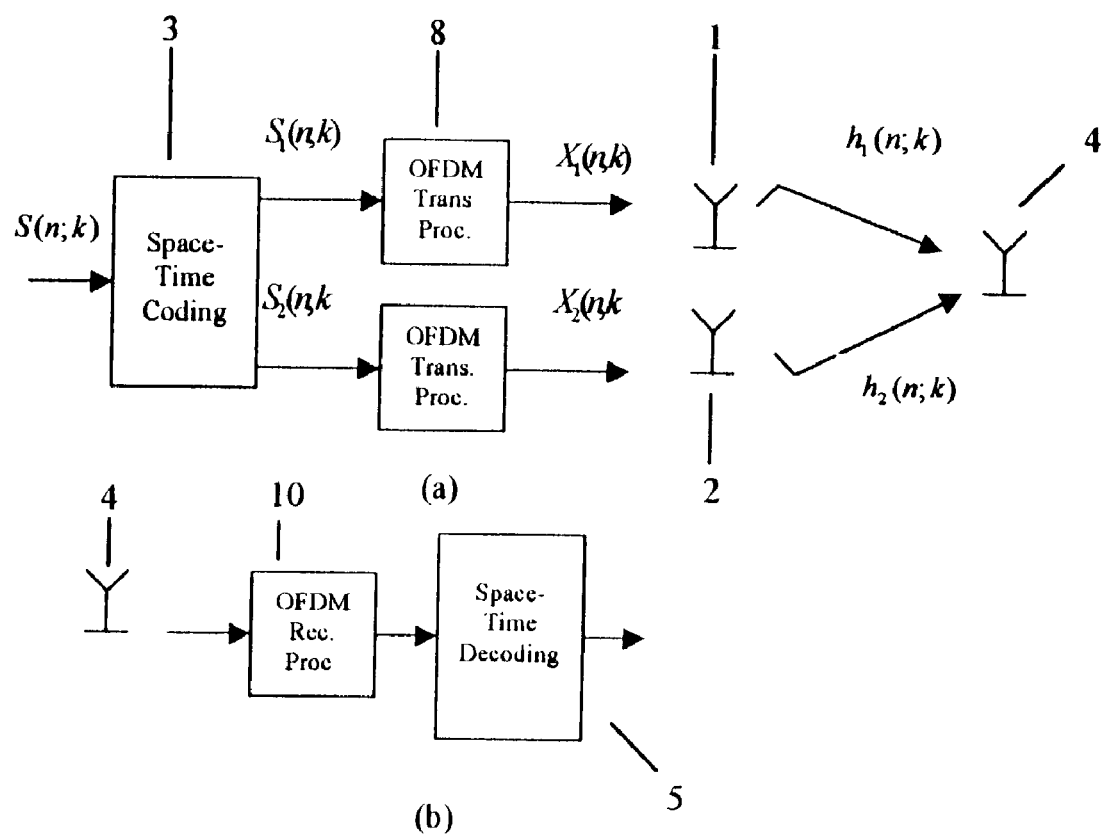
FIG. 3 (Prior Art) is a schematic diagram illustrating orthogonal frequency division multiplexing (OFDM) with transmit diversity at: (a) a transmitter; and (b) a receiver.

The present invention revolves around the use of multiple antennas at the base station to improve the downlink performance of a wireless communication system. Downlink beamforming is effective in limiting interference pollution, which is of critical importance especially in multimedia communications. Transmit diversity is a powerful technique when receive diversity is impractical, especially for mobile terminals with size and/or power limitations. It can also be used to further improve downlink performance even though receive diversity is available.

In a multipath propagation environment, a receiver acquires several time-delayed, amplitude-scaled and direction of arrival (DOA) dependent versions of a transmitted signal. When the maximum time delay between the first-arrived and last-arrived versions of a signal along the various paths is smaller than the symbol interval, these paths are not resolvable in the time domain. However, these paths are resolvable in the spatial domain as they may come from different DOAs. Since each path may experience independent fading, using a beamforming antenna array, one obtains several independent channels, to which transmit diversity is applicable.

When the maximum relative delay is greater than the symbol interval, a frequency selective fading channel is observed. Frequency selectivity is beneficial for achieving diversity, however, it also yields inter-symbol interference (ISI) which needs to be suppressed at the receiver. This phenomenon becomes more and more prevalent as the data transmission rate increases. One way to suppress ISI is to use equalization at the receiver. The performance of an equalizer, however, depends on the frequency responses of the wireless channels. Specifically, when the channel's frequency responses have deep nulls in a certain frequency band, the equalization output yields noise enhancement, the effect of which can degrade the diversity gain obtained by the frequency selectivity. On the other hand, An adaptive equalizer often promotes error propagation problems when decision-directed symbols are used as reference signals, and the complexity of the equalizer is further complicated if the delay spread is large.

Another method of reducing ISI is to reduce the delay spread using adaptive antennas at the base station. For example, if the base station knows the direction-of-arrival (DOA) information of each delayed version of the received signal, it can then form a beam to one path whilst arranging for nulls or small antenna gains at the DOAs of the other paths. In this manner, the mobile terminal only receives one path of each transmitted signal. This method, though simple in signal detection, sacrifices the diversity gain since use is only being made of one path.

Compared to receive diversity, transmit diversity has received greater attention during the past decade. Delay diversity as disclosed in A. Wittneben, "A new bandwidth efficient transmit antenna modulation diversity scheme for linear digital modulation", Proc. Of ICC'93, pp. 1630–1634, 1993, is one early transmit diversity technique using multiple transmit antennas. This method transforms a flat fading channel into a frequency selective fading channel making use of frequency diversity. An equalizer is provided at the mobile terminal in order to compensate for the artificially induced ISI. The performance of the equalizer depends on the frequency property of the channels. Further, an adaptive equalizer often promotes error propagation problems when decision-directed symbols are used as reference signals. In fact, it is shown in Y. C. Liang, Y. Li and K. J. R. Liu, "Feasibility of transmit diversity for IS-136 TDMA systems", Proc. Of VTC '98, pp. 2321–2324, 1998, that when the maximum Doppler frequency is over 40 Hz, this diversity method is even worse than that without diversity. In S. M. Alamouti, "A simple transmit diversity technique for wireless communications", IEEE Journal of Selected Areas in Communications, Vol. 16, No. 8, pp. 1451–1458, October 1998, Alamouti proposed a permutation diversity method, whose performance is similar to maximal-ratio combining (MRC) receive diversity. This method only requires a simple receiver structure. More general transmit diversity methods are referred to as space-time coding methods as disclosed in V. Tarokh, N. Seshadri and A. R. Calderbank, "Space-time codes for high data rate wireless communication: Performance analysis and code construction", IEEE trans. On Information Theory, vol. 44, No. 3, pp. 744–765, March 1998. Space-time codes include space-time trellis codes (STTC) and space-time block codes (STBC). In fact, permutation diversity is the simplest class of STBC.

FIG. 1 illustrating Alamouti's permutation diversity method shows the permutation diversity method with two transmit antennas 1, 2 equipped at the base station (BS). The signal s(n) to be transmitted is first coded in a space-time coding module 3 The space-time coding module 3 works in the following way. It has one input port and two output ports. The input port accepts the transmitted sequence, s(0), s(1), . . . . The two output ports provide, in response, respective output signals $s_1(t)$ and $s_2(t)$ at time instants t=n and t=n+1, where n is an even integer, as follows.

|  | t = n | t = n + 1 |
|---|---|---|
| $s_1(t)$ | $s(n)/\sqrt{2}$ | $s^*(n+1)/\sqrt{2}$ |
| $s_2(t)$ | $s(n+1)/\sqrt{2}$ | $-s^*(n)/\sqrt{2}$ |

At a single receive antenna 4 at the mobile terminal the signals received at time instants t=n and t=n+1 are given by $$x(n) = \alpha_1 s_1(n) + \alpha_2 s_2(n) + w(n) \quad (1)$$

$$x(n+1) = \alpha_1 s_1(n+1) + \alpha_2 s_2(n+1) + w(n+1) \quad (2)$$

where $\alpha_1$ and $\alpha_2$ are the respective channel responses from the two transmit antennas 1, 2 to the receiver antenna 4, respectively; w(n) is additive white Gaussian noise (AWGN).

The received signal is subsequently decoded by the space-time decoding module as follows. Specifically, equations (1) and (2) can be written in matrix forms:

$$\begin{bmatrix} x(n) \\ x(n+1) \end{bmatrix} = \frac{1}{\sqrt{2}} \begin{bmatrix} s(n) & s(n+1) \\ s^*(n+1) & -s^*(n) \end{bmatrix} \begin{bmatrix} \alpha_1 \\ \alpha_2 \end{bmatrix} + \begin{bmatrix} w(n) \\ w(n+1) \end{bmatrix} \quad (3)$$

$$\begin{bmatrix} x(n) \\ x^*(n+1) \end{bmatrix} = \frac{1}{\sqrt{2}} \begin{bmatrix} \alpha_1 & \alpha_2 \\ -\alpha_2^* & \alpha_1^* \end{bmatrix} \begin{bmatrix} s(n) \\ s(n+1) \end{bmatrix} + \begin{bmatrix} w(n) \\ w^*(n+1) \end{bmatrix} \quad (4)$$

Therefore, channel coefficients can be estimated via equation (3) using training symbols; while equation (4) can be used for signal estimation/detection. This signal detection method is also called permutation decoding.

It is pointed out that, as opposed to delay diversity techniques which require a complicated equalizer at the receiver, the channel estimation and signal detection for permutation diversity involves very simple numerical operations. Also, compared to a one-transmitter/two-receiver receive diversity technique, even though the permutation diversity method has a 3 dB performance loss, it achieves the same order of diversity gain as receive diversity techniques using a maximal ratio combining (MRC) approach.

Permutation diversity can be extended to space-time block codes (STBC) and space-time trellis codes (STTC). All these codes achieve transmit diversity for flat fading environment.

One example of the invention applies Alamouti's diversity method to frequency selective fading channels. When the delay spread is greater than the symbol interval, frequency selective fading channels are observed. FIG. 2 illustrates the system model applying Alamouti's diversity method to frequency selective fading channels. The transmitted signal, s(n), is first coded using Alamouti's codes in the coding module 3, with the two branch outputs as $s_1(n)$ and $s_2(n)$. $s_1(n)$ and $s_2(n)$ are then passed into two pre-equalizers, 6, 7 having functions $g_1(k)$ and $g_2(k)$, to produce two output sequences $y_1(n)$ and $y_2(n)$. $y_1(n)$ and $y_2(n)$ are finally modulated and up-converted as RF signals, which are sent out through the transmit antennas 1, 2 as physical channels $h_1(k)$ and $h_2(k)$.

The functions $g_1(k)$ and $g_2(k)$ of the pre-equalizers 6,7 are used to pre-equalize the two physical channels, $h_1(k)$ and $h_2(k)$, respectively. By designing the pre-equalizers with zero-forcing criterion, the overall channel responses, $g_1(k)$ *$h_1(k)$ and $g_2(k)$*$h_2(k)$, are now flat fading channels, with which Alamouti's coding/decoding method can be used. Here, "*" denotes a convolution operation.

In order to design the pre-equalizers 6,7, the real channel coefficients, $h_1(k)$ and $h_2(k)$, should be known at the base station/transmit antennas 1, 2. This can be done in two ways. For time-division duplex (TDD) systems, downlink channel coefficients are the same as uplink channel coefficients, which are derivable from the uplink using training symbols or blind techniques (up to a constant scaler). For frequency-division duplex (FDD) systems, the base station sends a set of training symbols to the mobile terminal, which then estimates and feeds back the downlink channel information to the base station.

The above methods are also applicable for other space-time codes.

Orthogonal frequency division multiplexing (OFDM) is a known and effective method of combatting the large delay spread problem. The combination of OFDM with a transmit diversity method not only suppresses large delay spread, but also achieves transmit diversity gain. FIG. 3 shows a prior art OFDM system with two-antenna transmit diversity as described in Y. Li, N. Seshadri and S. Ariyavisitakul, "Channel estimation for OFDM systems with transmitter diversity in mobile wireless channels", IEEE Journal of Selected Areas in Communications, vol. 17, No. 3, pp. 461–471, March 1999. The signal to be transmitted, S(n;k), is first coded using space-time codes in coding module 3, yielding two branch outputs as $S_1$(n;k) and $S_2$(n;k). $S_1$(n;k) and $S_2$(n;k) are then passed into respective normal OFDM transmit processors 8, 9, whose outputs are finally modulated and up-converted as RF signals, which are sent out through transmit antennas 1, 2.

At the single antenna receiver 4 at the mobile station, the received signal is passed into a normal OFDM receive processor 10, followed by a space-time decoder module 5. Specifically, the fast Fourier transform (FFT) output becomes $$X(n;k)=H_1(n;k)S_1(n;k)+H_2(n;k)S_2(n;k)+W(n;k) \quad (5)$$

$$X(n;k+1)=H_1(n;k+1)S_1(n;k+1)+H_2(n;k+1)S_2(n;k+1)+W(n;k+1) \quad (6)$$

In (5) and (6), $H_1$(n;k) and $H_2$(n;k) are, respectively, the Fourier transforms of the channel impulse responses, $h_1$(n;k) between transmit antenna 1 and receive antenna 4, and $h_2$(n;k) between transmit antenna 2 and receive antenna 4; W(n;k) is the FFT output of the additive noise, w(n;k), received at the receive antenna 4.

Permutation decoding methods can be easily applied if $S_1$(n;t) and $S_2$(n;t) at time instants t=k and t=k+1, where k is an even integer, are chosen as follows:

|  | t = k | t = k + 1 |
| --- | --- | --- |
| $S_1$(n; t) | S(n; k)/$\sqrt{2}$ | S*(n; k + 1)/$\sqrt{2}$ |
| $S_2$(n; t) | S(n; k + 1)/$\sqrt{2}$ | −S*(n; k)/$\sqrt{2}$ |

Prior Art: Combined Beamforming and Transmit Diversity for Flat Fading Channels.

The above three methods (Alamouti's permutation diversity method, a diversity method applied to frequency selective fading channels and OFDM with transmit diversity) achieve transmit diversity gain for flat fading channels, or frequency selective fading channels. The transmit antennas belong to diversity antennas, i.e., the antenna spacing is large, e.g., ten times wavelength, typically.

Figure 4:
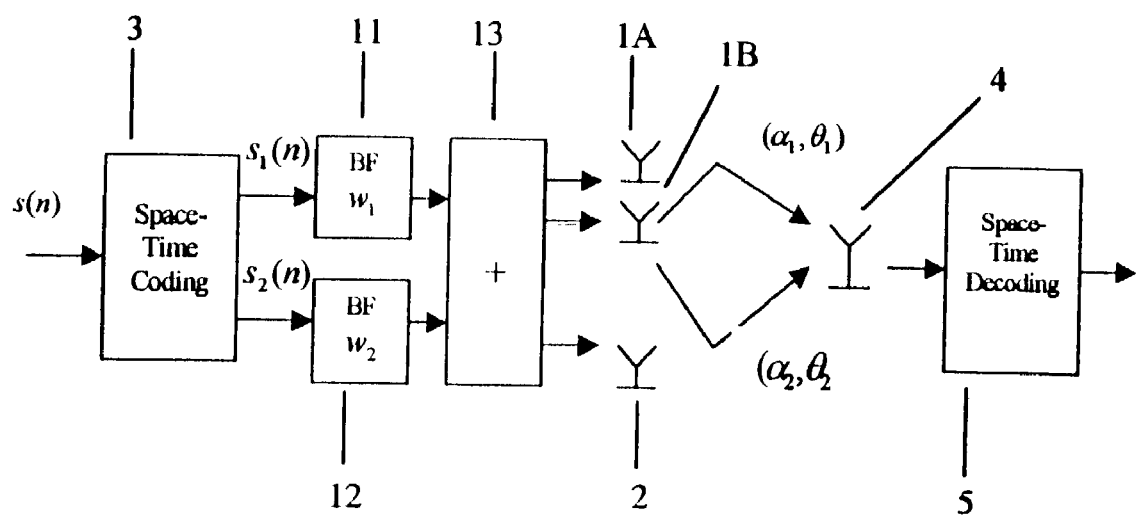
FIG. 4 (Prior Art) is a schematic diagram illustrating OFDM combined beamforming and transmit diversity for flat fading channels.

FIG. 4 shows a known system combining beamforming and transmit diversity for flat fading channels as disclosed in R. Negi, A. M. Tehrani and J. Cioffi, "Adaptive antennas for space-time coding over block invariant multipath fading channels", Proc. of IEEE VTC, pp. 70–74, 1999. The signal to be transmitted, s(n), is first coded using a space-time coder module 3, yielding two branch outputs as $s_1$(n) and $s_2$(n). $s_1$(n) and $s_2$(n) are then passed into two transmit beamformers 11,12, $w_1$ and $w_2$, respectively, followed by a signal combiner 13 which performs a simple summing function of the two inputs to producing a signal x(n) for transmission which, in vector form, is as follows:

$$x(n)=w_1^H s_1(n)+w_2^H s_2(n) \quad (7)$$

To obtain spatial selectivity, the antenna spacing, d, is set to be small, e.g., half wavelength, and the number of transmit antennas 1A, 1B, 2, M, is greater than two. This is a beamforming antenna array, instead of a diversity antenna array. Suppose the physical channel consists of L spatially separated paths, whose fading coefficients and DOAs are denoted as $(\alpha_k(t), \theta_k)$, for k=1, . . . , L. If the maximum time delay relative to the first arrived path is smaller than the symbol interval, a flat fading channel is observed, and the instantaneous channel response, $h_d$(t), can be expressed as follows:

$$h_d(t) = \sum_{k=1}^{L} \alpha_k(t) a_d(\theta_k) \quad (8)$$

where $a_d(\theta_k)$ is the downlink steering vector at DOA $\theta_k$. The received signal, y(n), at the mobile terminal is given by $$y(n)=w_1^H h_d(t)s_1(n)+w_2^H h_d(t)s_2(n)+w(n) \quad (9)$$

By denoting $\beta_1(t)=w_1^H h_d(t)$, $\beta_2(t)=w_2^H h_d(t)$, the transmit beamforming weights can be estimated by maximizing the cost function:

$$J=E|\beta_1(t)|^2+E|\beta_2(t)|^2 \quad (10)$$

$$s.t.\ E[\beta_1(t)\beta_2^*(t)]=0 \quad (11)$$

Maximum average signal to noise ratio (SNR) is obtained by maximising (10); while condition (11) guarantees that $\beta_1$(t) and $\beta_2$(t) are statistically uncorrelated, thus maximum diversity gain can be achieved.

Comparing (9) with (1), with the aid of downlink beamforming, two statistical uncorrelated fading channels, $\beta_1$(t) and $\beta_2$(t) have been artificially generated, with which space-time decoding can be used to recover the transmitted signal, s(n). For Alamouti's diversity method, permutation decoding is applied.

The optimal transmit beamforming weight vectors are the eigenvectors corresponding to the two largest eigenvalues of the downlink channel covariance matrix (DCCM):

$$R_d=E[h_d(t)h_d^H(t)] \quad (12)$$

where the expectation is conducted over all fading coefficients. Suppose all paths have the same average power, or $E|\alpha_k(t)|^2=1/L$, the DCCM is given by $$R_d = \frac{1}{L}\sum_{k=1}^{L} a_d(\theta_k)a_d^H(\theta_k) \quad (13)$$

For TDD, DCCM is the same as uplink channel covariance matrix (UCCM). For FDD, there are two ways to estimate the DCCM, both of which are based on the fact that uplink and downlink signals go through the same DOAs. The first method estimates the DOAs of all paths from the received uplink signals first, then constructs the downlink steering vectors, $a_d(\theta_k)$'s, and further DCCM $R_d$ via equation (13). The second method estimates DCCM from UCCM directly via frequency calibration processing as disclosed in Y-C. Liang and F. Chin, "Downlink beamforming methods for capacity enhancement in wireless communication systems", Singapore Patent Application No. 9904733.4. This method does not involve DOA estimation and its associates and is therefore simple to implement.

This system achieves diversity gain and beamforming gain simultaneously for flat fading environment but it is desirable to extend that system into a frequency selective fading environment.

For mobile wireless communications without beamforming, the two ray (TR) model, typical urban (TU) model, and hilly terrain (HT) model are three commonly used power-delay profiles. When downlink beamforming is added, a power-delay-DOA profile should be considered. In picocell, microcell, and macrocell with TU model, there is less correlation between path delays and the DOAs. However, in macrocell with TR and HR models, the path delays are usually statistically dependent on the DOAs. We will show that for different environments, there exist different schemes to achieve combined beamforming and transmit diversity gains, as well as maximum spectrum efficiency.

Another example of the invention utilises OFDM to obtain combined beamforming and transmit diversity.

Figure 5:
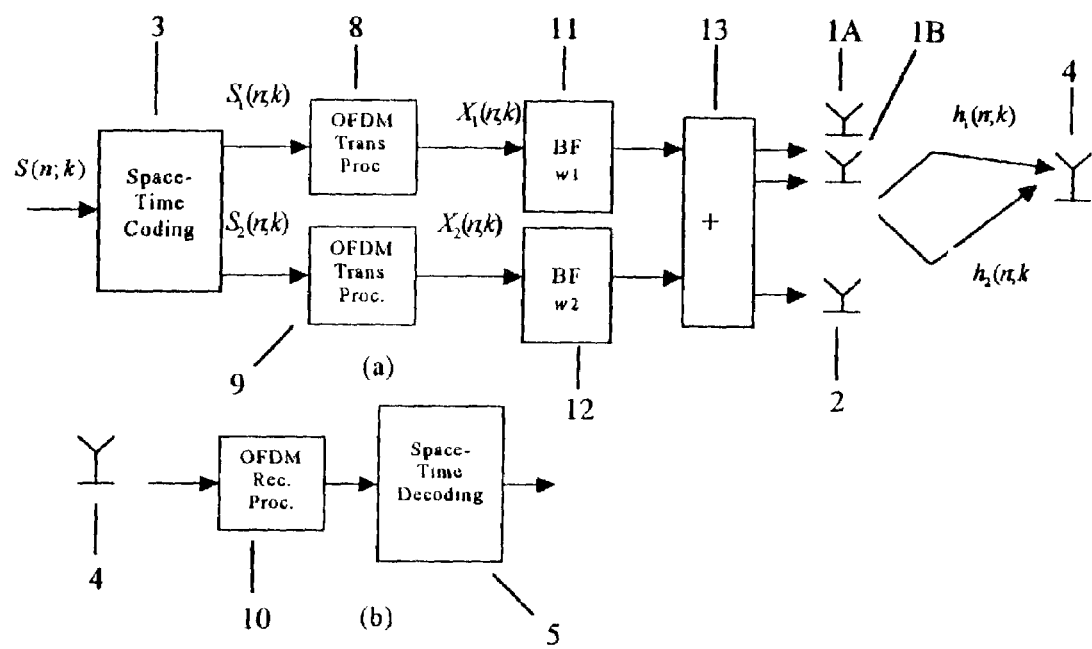
FIG. 5 is a schematic diagram illustrating a method embodying the present invention using OFDM with combined beamforming and transmit diversity at: (a) a transmitter; and (b) a receiver.

Combined beamforming and transmit diversity can be achieved by using OFDM for frequency selective fading channels. FIG. 5 shows the OFDM system with combined beamforming and transmit diversity. Even though OFDM is selected as one example to show how the delay spread can be reduced, while yet maintaining beamforming and transmit diversity gain, other examples being other multi-carrier modulation schemes, such as MC-CDMA, MC-DS-CDMA and single carrier systems with cyclic prefix.

The transmitted signal at the kth tone of the nth block, $S(n;k)$, is first coded at the base station using space-time codes in coding module 3, yielding two branch outputs, $S_1(n;k)$ and $S_2(n;k)$. $S_1(n;k)$ and $S_2(n;k)$ are passed into respective normal OFDM transmit processors 8,9, followed by two transmit beamformers, 10,11, ($w_1$ and $w_2$) respectively. The beamforming outputs are finally combined in a combiner 13, and transmitted out through the transmit antennas 1A, 1B, 2 of the base station antenna array.

With the base station antenna array 1A, 1B, 2, the complex baseband representation of a wireless channel impulse response can be described as the following vector form $$h_d(t;\tau) = \sum_m \sum_l \gamma_{m,l}(t) a_d(\theta_{m,l}) \delta(\tau - \tau_m) \quad (14)$$

where $\tau_m$ is the delay of the mth path resolved in time, $\gamma_{m,l}(t)$ and $\alpha_d(\theta_{m,l})$ are the complex amplitude and downlink steering vector corresponding to lth DOA of the mth delay path. Because of the motion of the vehicular, $\gamma_{m,l}(t)$'s are wide-sense stationary (WSS) narrow band complex Gaussian processes, which are zero-mean and statistically independent for different m's, or l's. Suppose all $\gamma_{m,l}(t)$'s have the same normalized correlation function, $r(t)$ ($r(0)=1$), but possibly different average power, $\sigma_{m,l}^2$, then $$E[\gamma_{m,l}(t+\Delta t)\gamma_{m,l}^*(t)] = \sigma_{m,l}^2 r(\Delta t) \quad (15)$$

The Fourier transform (FT) of $h(t;\tau)$ at time instant t is given by $$H_d(t;f) = \int_{-\infty}^{\infty} h_d(t;\tau) e^{-j2\pi f\tau} d\tau = \sum_m \sum_l \gamma_{m,l}(t) a_d(\theta_{m,l}) e^{-j2\pi f\tau_m} \quad (16)$$

For an OFDM system with block length $T_b$ and tone spacing $f_t$, the discrete value of $H(t;f)$ is given by $$H_d[n;k] \triangleq H_d(nT_b; kf_t) = \sum_m \sum_l \gamma_{m,l}(nT_s) a_d(\theta_{m,l}) e^{-j2\pi kf_t\tau_m} \quad (17)$$

thus the correlation function matrix of the frequency response for different times and frequencies is given by $$r_d[\Delta n, \Delta k] = \quad (18)$$
$$E[H_d[n+\Delta n; k+\Delta k] H_d^H[n;k]] = r(\Delta n T_b) \sum_m e^{-j2\pi\Delta kf_t\tau_m} R_{d,m}$$

where $$R_{d,m} = \sum_l \sigma_{m,l}^2 a_d(\theta_{m,l}) a_d^H(\theta_{m,l})$$

is the downlink channel covariance matrix corresponding to the mth delay path. Note for $\Delta n=0$ and $\Delta k=0$, $$r_d[0;0] = \sum_m \sum_l \sigma_{m,l}^2 a_d(\theta_{m,l}) a_d^H(\theta_{m,l}) \triangleq R_d \quad (19)$$

At the mobile terminal single antenna 4, the received signals are first passed into normal OFDM receive processor 10, followed by a permutation decoder 5. Within the normal OFDM receive processor, the FFT output becomes $$X[n;k] = w_1^H H_d[n;k] S_1[n;k] + w_2^H H_d[n;k] S_2[n;k] + W[n;k] \quad (20)$$

$$X[n;k+1] = w_1^H H_d[n;k+1] S_1[n;k+1] + w_2^H H_d[n;k+1] W[n;k+1] \quad (21)$$

where $W[n;k]$ is zero mean AWGN.

By denoting $\beta_1 = w_1^H H_d[n;k]$, $\beta_2 = w_2^H H_d[n;k]$, the beamforming weights can be estimated by maximizing the cost function:

$$J = E|\beta_1|^2 + E|\beta_2|^2 \quad (22)$$

$$s.t.\ E[\beta_1 \beta_2^*] = 0 \quad (23)$$

Again, maximum average SNR is obtained through maximizing equation (22); while condition (23) guarantees that $\beta_1$ and $\beta_2$ are statistically uncorrelated, thus maximum diversity gain can be achieved.

The optimal transmit beamforming weight vectors are the eigenvectors corresponding to the two largest eigenvalues of downlink, channel covariance matrix (DCCM) $R_d$.

$$R_d = E[H_d[n;k] H_d^H[n;k]] \quad (24)$$

Comparing equations (20) and (21) with equations (5) and (6), with the aid of downlink beamforming, two uncorrelated fading channels are generated, with which the space-time decoding can be used to recover the transmitted signal.

Permutation decoding method can be applied if $S_1(n;k)$ and $S_2(n;k)$ are chosen as follows.

| | t = k | t = k + 1 |
|---|---|---|
| $S_1(n; t)$ | $s(n; k)/\sqrt{2}$ | $s^*(n; k + 1)/\sqrt{2}$ |
| $S_2(n; t)$ | $s(n; k + 1)/\sqrt{2}$ | $-s^*(n; k)/\sqrt{2}$ |

A frequency calibration method for DCCM estimation for OFDM.

In order to generate the downlink beamforming weights, it is first necessary to construct the DCCM. A frequency calibration (FC) method disclosed in Y-C. Liang and F. Chin, "Downlink beamforning methods for capacity enhancement in wireless communication systems", Singapore Patent Application No. 9904733.4 is applied.

Using a similar method, we can show that the correlation function matrix of the uplink frequency response for different times and frequencies is given by $$r_u[\Delta n; \Delta k] = \qquad (25)$$
$$E[H_u[n + \Delta n; k + \Delta k]H_u^H[n; k]] = r(\Delta n T_b)\sum_m e^{-j2\pi\Delta k f_i \tau_m} R_{u,m}$$

where $$R_{u,m} = \sum_l \sigma_{m,l}^2 a_u(\theta_{m,l})a_u^H(\theta_{m,l})$$

is the uplink channel covariance matrix corresponding to the mth delay path. Note for $\Delta n=0$ and $\Delta k=0$, $$r_u[0; 0] = \sum_m \sum_l \sigma_{m,l}^2 a_u(\theta_{m,l})a_u^H(\theta_{m,l}) \triangleq R_u \qquad (26)$$

Comparing equations (19) and (26), the FC method devised in Y-C. Liang and F. Chin, "Downlink beamforming methods for capacity enhancement in wireless communication systems", Singapore Patent Application No. 9904733.4 is used to estimate the DCCM from UCCM.

This system provides diversity gain and beamforming gain for OFDM systems. In this system, the length of cyclic prefix is determined by the maximum physical time delay, and is the same as that in a normal OFDM system. Thus it is readily applicable to the environment in which the DOA is statistically independent of the time delay.

When the DOA of a path is statistically related to the path delay, e.g., in TR and HR environments, one can not only achieve beamforming gain and diversity gain simultaneously, but also reduce the cyclic prefix, thus obtaining improved spectrum efficiency.

A further example of the present invention utilises combined beamforming and transmit diversity for frequency selective fading channels for two ray (TR) models.

Suppose the physical channel follows a TR model. With the base station antenna array, the complex baseband representation of a wireless channel impulse response can be described as the following vector form $$h_d(t; \tau) = \sum_{m=1}^{2} h_{d,m}(t)\delta(\tau - \tau_m) \qquad (27)$$

with $$h_{d,m}(t) = \sum_l \gamma_{m,l}(t)a_d(\theta_{m,l}) \qquad (28)$$

where $\tau_m$ is the delay of the mth path resolved in time, $\gamma_{m,l}(t)$ and $a_d(\theta_{m,l})$ are the complex amplitude and downlink steering vector corresponding to lth DOA of the mth delay path. Because of the motion of the vehicular, $\gamma_{m,l}(t)$'s are wide-sense stationary (WSS) narrow band complex Gaussian processes, which are zero-mean and statistically independent for different m's, or l's. Suppose all $\gamma_{m,l}(t)$'s have the same normalized correlation function, r(t) (r(0)=1), but possibly different average power, $\sigma_{m,l}^2$, then $$E[\gamma_{m,l}(t+\Delta t)\gamma_{m,l}^*(t)] = \sigma_{m,l}^2 r(\Delta t) \qquad (29)$$

ISI exists when $\Delta\tau=\tau_2-\tau_1$ is greater than the symbol interval. With combined beamforming and diversity technique, if the two rays are spatially separated, it is possible to transfer a frequency selective fading channel into a flat fading channel, yet maintain the transmit diversity.

Figure 6:
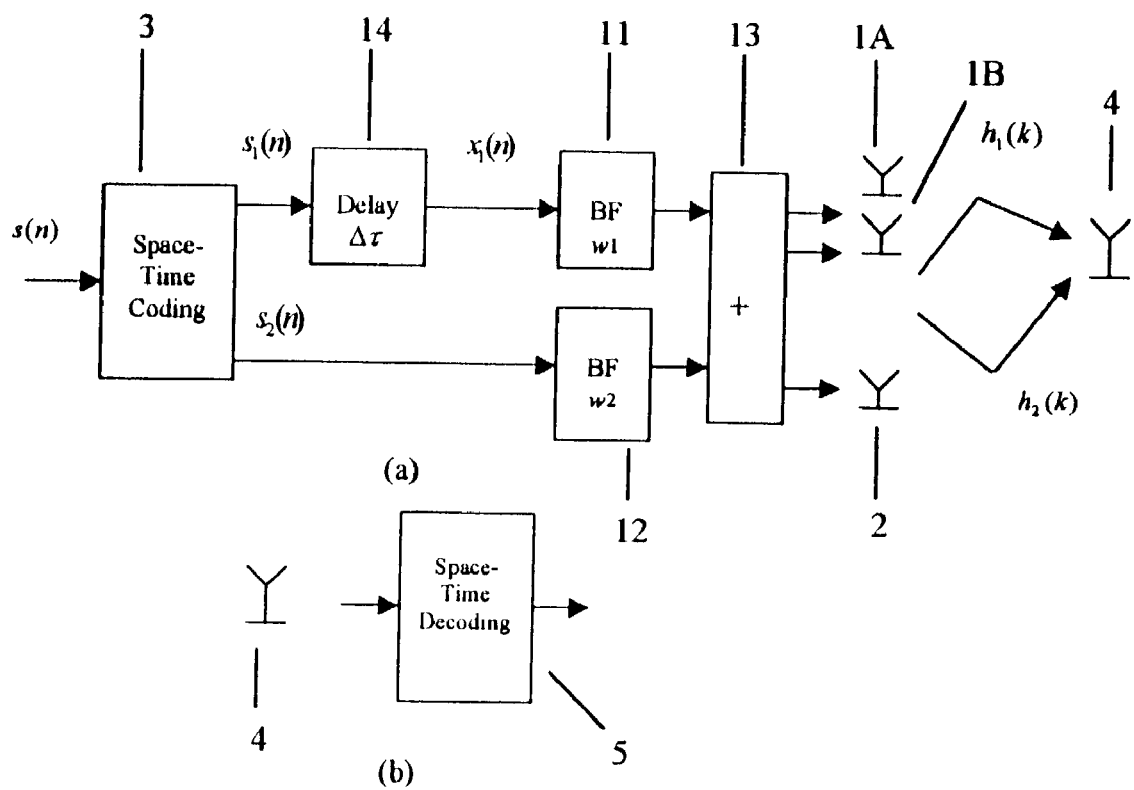
FIG. 6 is a schematic diagram illustrating a method embodying the present invention using combined beamforming and transmit diversity for two ray (TR) frequency selective fading channels at (a) a transmitter; and (b) a receiver.

FIG. 6 shows a communication system with combined beamforming and transmit diversity for two-ray frequency selective fading channels. The signal to be transmitted, s(n), is first coded in a coding module 3 using space-time codes, with the two branch outputs as $s_1(n)$ and $s_2(n)$. $s_1(n)$ is then fed through a delay 14 to delay s(n) by $\Delta\tau$, yielding $x_1(n)$, which is further passed to transmit beamformer 11, ($w_1$). The second branch output $s_2(n)$ is directly passed to the other transmit beamformer 12, ($w_2$). The beamforming outputs are then combined in combiner 13 and sent by transmit antennas 1A, 1B, 2, yielding the transmitted signal as follows:

$$x(n) = w_1^H x_1(n) + w_2^H s_2(n) \qquad (30)$$

The received signal, y(n), at the mobile terminal single antenna 4 is given by $$y(n) = w_1^H h_{d,1} x_1(n) + w_1^H h_{d,2} x_1(n - \Delta\tau) + \qquad (31)$$
$$w_2^H h_{d,1} s_2(n) + w_2^H h_{d,2} s_2(n - \Delta\tau) + w(n)$$

Denoting $z(n)=y(n+\Delta\tau)$, and considering the pre-alignment of the two transmitted signals, gives:

$$z(n) = w_1^H h_{d,1} s_1(n) + w_1^H h_{d,2} s_1(n - \Delta\tau) + \qquad (32)$$
$$w_2^H h_{d,1} s_2(n + \Delta\tau) + w_2^H h_{d,2} s_2(n) + w(n + \Delta\tau)$$

The beamforming weights are chosen such that the first branch output, $s_1(n)$, just goes through the first path, $h_{d,1}$ between the base station antenna array and the receive antenna 4; while the second branch output, $s_2(n)$, just goes through the second path, $h_{d,2}$ between the base station antenna array and the receive antenna 4. Mathematically, $$\begin{cases} w_1^H h_{d,2} = 0 \\ |w_1^H h_{d,1}|^2 = \max \end{cases}$$

and $$\begin{cases} w_2^H h_{d,1} = 0 \\ |w_2^H h_{d,2}|^2 = \max \end{cases}$$

In this case the ISI terms are suppressed completely, and z(n) can be written as $$z(n) = w_1^H h_{d,1} s_1(n) + w_2^H h_{d,2} s_2(n) + w(n + \Delta\tau) \qquad (33)$$

Thus the frequency selective fading channel is now transformed into a flat fading channel, with which the transmit diversity method can be applied.

Conveniently, the transmit beamforming weights can be chosen by maximizing the average transmit SINR functions:

$$J_1(w_1) = \frac{w_1^H R_{d,1} w_1}{w_1^H R_{d,2} w_1} \text{ and } J_2(w_1) = \frac{w_2^H R_{d,2} w_2}{w_2^H R_{d,1} w_2} \qquad (34)$$

where $$R_{d,m} = E[h_{d,m}(t)h_{d,m}^H(t)] = \sum_l \sigma_{m,l}^2 a_d(\theta_{m,l}) a_d^H(\theta_{m,l})$$

is the downlink channel covariance matrix of the mth path.

Preferably, the transmit beamforming weights can be chosen by maximizing the average receive SINR at the mobile receiver, i.e., $$J = \frac{w_1^H R_{d,1} w_1 + w_2^H R_{d,2} w_2}{w_1^H R_{d,2} w_1 + w_2^H R_{d,1} w_2 + \sigma_n^2}, \qquad (35)$$

Advantageously, the transmit beamforming weights, $w_m$, can be chosen as the principal eigenvector of $R_{d,m}$.

Again, the frequency calibration method disclosed in Y-C. Liang and F. Chin, "Downlink beamforming methods for capacity enhancement in wireless communication systems", Singapore Patent Application No. 9904733.4 is used to estimate the DCCM from UCCM directly.

The above method for achieving combined beamforming and transmit diversity gain is called pre-alignment (PAL) method. The purpose of delaying $s_1(n)$ by $\Delta\tau$ is to make sure that the major components of the two sequences, $s_1(n)$ and $s_2(n)$ arrive at the receiver at the same time. Therefore, the delay spread has been reduced to zero. On the other hand, beamforming is used to minimize the ISI effect as well as to artificially generate two uncorrelated channels, with which the transmit diversity gain is achieved.

The PAL method requires the delay information, $\Delta\tau$, which is embedded in the downlink power-delay-DOA (PDD) profile. Even though the PDD profile is time varying, it changes slowly in time. Also, downlink PDD profile is almost the same as uplink PDD profile, which can be estimated from received uplink signals.

The PAL method can also be applied to the systems whose number of rays is grater than 2. In this case, it requires more than 2 branches of space-time coding outputs, and each output except the first one corresponds to one delay. If the number of space-time coding outputs is fixed, say 2, the two major rays can be selected in order to generate the delay, $\Delta\tau$, and the transmit beamforming weights. The direct application of this system is to reduce inter-finger-interference in CDMA as the total number of fingers is reduced.

Conventionally, when the physical channel h(k) consists of multiple rays with two major rays $h_1(k)$, $h_2(k)$ delayed by $\Delta\tau$, the beamforming weights are chosen such that the delayed signal only goes through one ray $h_1(k)$ between the base station multiple transmit antennae and the receive antenna, whilst the undelayed signal only goes through another ray $h_2(k)$ between the base station multiple transmit antennae and the receive antenna.

Advantageously, when the physical channel h(k) consists of multiple rays with two major rays $h_1(k)$, $h_2(k)$ delayed by $\Delta\tau$, the beamforming weights are chosen such that the average transmit SINR function at the base station is maximized for each ray.

Preferably, when the physical channel h(k) consists of multiple rays with two major rays $h_1(k)$, $h_2(k)$ delayed by $\Delta\tau$, the beamforming weights are chosen such that the average receive SINR function at the mobile terminal is maximized.

Another example of the present invention utlises OFDM with combined beamforming and transmit diversity for frequency selective fading channels for two ray (TR) models.

There is a direct use of delay spread reduction in OFDM. In a typical OFDM system, a cyclic prefix is added in order to remove the ISI and to guarantee the orthogonality between each sub-channel. The length of the cyclic prefix should be greater than the maximum time delay, which can be as large as $40^{\mu s}$ for a mobile wireless communication environment. The adding of the cyclic prefix not only degrades the spectrum efficiency, but also occupies one portion of the transmit power. The spectrum efficiency and power efficiency of the OFDM system can be greatly improved if the cyclic prefix can be reduced while maintaining the same performance.

Suppose the physical channel follows a TR model with parameters $(a_k, \theta_k, \tau_k)$, k=1,2 and $\tau_1 < \tau_2$. $\alpha_k$'s are statistically independent, zero mean complex Gaussian processes with variance $\sigma_k^2$. ISI exists when $\Delta\tau = \tau_2 - \tau_1$ is greater than the inverse of bandwidth.

Figure 7:
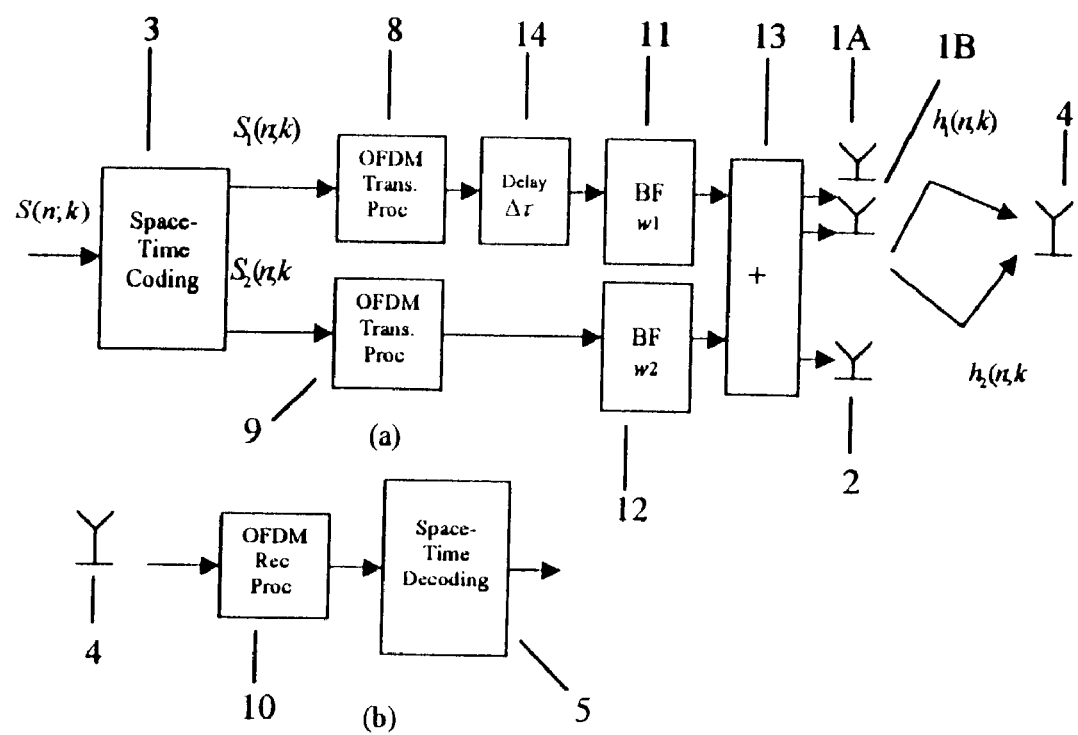
FIG. 7 is a schematic diagram illustrating a method embodying the present invention using OFDM with combined beamforming and transmit diversity for two ray (TR) models at: (a) a transmitter; and (b) a receiver.

FIG. 7 illustrates an OFDM system with combined beamforming and transmit diversity for TR models embodying the present invention. The transmitted signal at the kth tone of the nth block, S(n;k), is first coded using space-time codes in coding module 3, yielding two branch outputs, $S_1(n;k)$ and $S_2(n;k)$. Both branch outputs $S_1(n;k)$ and $S_2(n;k)$ are passed into respective OFDM transmit processors 8,9 without adding cyclic prefixes. $S_1(n;k)$ is then delayed in delay 14 by $\Delta\tau$, yielding $X_1(n;k)$, which is further passed to transmit beamformer 11, $(w_1)$. The second branch output $S_2(n;k)$ is directly passed to the other transmit beamformer 12, $(w_2)$. The beamforming outputs are then combined and sent on the base station transmit antenna array 1A, 1B, 2, yielding the transmitted signal as follows:

$$x(n;k) = w_1^H x_1(n;k) + w_2^H s_2(n;k) \qquad (36)$$

At the mobile terminal single antenna 4, the received signals are first passed into a normal OFDM receive processor 10. The beamforming weights are chosen such that the first branch output, $S_1(n;k)$ or its inverse FFT (IFFT), $s_1(n;k)$, just goes through the first path, $h_1(n;k)$ between the base station antenna array and the receive antenna 4; while the second branch output, $S_2(n;k)$ or its inverse FFT (IFFT), $s_2(n;k)$, just goes through the second path, $h_1(n;k)$ between the base station antenna array and the receive antenna 4. Once the transmit beamforming weights are properly chosen, the FFT output of the received signal at the mobile station becomes $$Z[n;k]=w_1^H H_1[n;k]S_1[n;k]+w_2^H H_2[n;k]S_2[n;k]+W[n;k+\lfloor \Delta \tau f_s \rfloor] \quad (37)$$

Comparing equation (37) with equation (5), with the aid of downlink beamforming, two different channels have been artificially created which can be space-time decoded by module 5 to recover the transmitted signal. Further, permutation decoding method can be easily applied if $S_1(n;k)$ and $S_2(n;k)$ are chosen as follows.

|  | t = k | t = k + 1 |
|---|---|---|
| $S_1(n; t)$ | $s(n; k)/\sqrt{2}$ | $s^*(n; k + 1)/\sqrt{2}$ |
| $S_2(n; t)$ | $s(n; k + 1)/\sqrt{2}$ | $-s^*(n; k)/\sqrt{2}$ |

When PAL is applied to an OFDM system with combined beamforming and transmit diversity for TR models, it is not necessary to add the cyclic prefix. Thus benefiting from the advantages of: transmit diversity; beamforming gain; and increased spectrum efficiency.

Conveniently, the transmit beamforming weights can be chosen by maximizing the average transmit SINR functions.

Preferably, the transmit beamforming weights can be chosen by maximizing the average receive SINR at the mobile receiver.

Advantageously, the transmit beamforming weights, $w_m$, can be chosen as the principal eigenvector of $R_{d,m}$.

Again, the frequency calibration method disclosed in Y-C. Liang and F. Chin, "Downlink beamforming methods for capacity enhancement in wireless communication systems", Singapore Patent Application No. 9904733.4 is used to estimate the DCCM from UCCM directly.

A comparison of the spectrum efficiency and power savings by using this delay spread reduction method will follow.

A further example of the invention utilises OFDM with combined beamforming and transmit diversity for frequency selective fading channels for hilly terrain (HT) models.

Even though the maximum time delay can be as large as $40^{\mu s}$, a wireless channel satisfying HT model can be described by several dominated clustered paths, each of which has a small delay spread. These clustered paths are also spatially separated. For an OFDM with typical HT power-delay profile whose maximum time delay is $20^{\mu s}$, and maximum delay spread for each clustered path is $2^{\mu s}$, the minimum length of cyclic prefix is $20^{\mu s}$ in order to remove the ISI. However, with the PAL method, the cyclic prefix duration can be reduced to $2^{\mu s}$.

Suppose the two clustered paths are delayed by $\psi$, and for simplicity, assume the delay spread for each clustered path is $\Delta\psi$. The impulse response of the time varying channel can be described as $$h(t;\tau)=h_1(t;\tau)[u(\tau)-u(\tau-\Delta\psi)]+h_2(t;\tau-\psi)[u(\tau-\psi)-u(\tau-\psi-\Delta\psi)] \quad (38)$$

where $h_1(t;\tau)$ and $h_2(t;\tau)$ correspond to the channel responses of the first and second clustered paths, respectively; and $u(x)$ is a unit step function.

Figure 8:
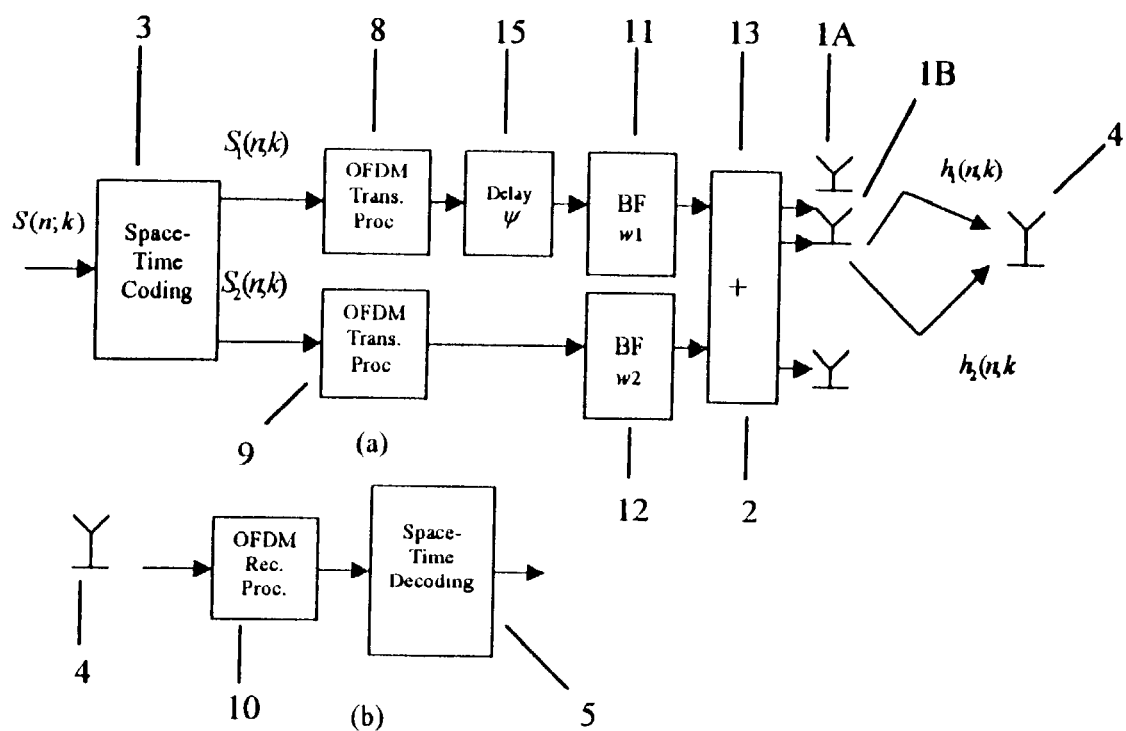
FIG. 8 is a schematic diagram illustrating a method embodying the present invention using OFDM with combined beamforming and transmit diversity for hilly-terrain (HR) models at (a) a transmitter; and (b) a receiver.

FIG. 8 shows an OFDM system embodying the present invention with combined beamforming and transmit diversity for hilly terrain (HT) model in encoder module 3. The signal to be transmitted at the kth tone of the nth block, $S(n;k)$, is first coded using space-time codes in encoder module 3, yielding two branch outputs, $S_1(n;k)$ and $S_2(n;k)$ which are passed into respective normal OFDM transmit processors 8,9, whose cyclic prefix length is $\Delta\psi$, instead of $\psi+\Delta\psi$. The output from the first branch is then delayed by $\psi$ in delay 15, while the output from the second branch remains unchanged. After that, the signals are passed into respective transmit beamformers 11,12, ($w_1$ and $w_2$), respectively. The beamforming outputs are then combined in combiner 13, and transmitted out through the base station transmit antenna array 1A, 1B, 2.

The beamforming weights are chosen such that the first branch input just goes through the first clustered path, while the second branch input just goes through the second clustered path—i.e. the beamforming weights are chosen such that the first branch output, $s_1(n)$, just goes through the first path, $h_{d,1}$ between the base station antenna array and the receive antenna 4; while the second branch output, $s_2(n)$, just goes through the second path, $h_{d,2}$ between the base station antenna array and the receive antenna 4. The signals received at the mobile terminal single antenna 4 are first passed into a normal OFDM receive processor 10, followed by a space-time decoding module 5. Within the normal OFDM receive processor 10, the received signal after FFT becomes $$Z[n;k]=w_1^H H_1[n;k]S_1[n;k]+w_2^H H_2[n;k]S_2[n;k]+W[n;k+\lfloor \psi f_s \rfloor] \quad (39)$$

where $\lfloor x \rfloor$ denotes the maximum integer which is not greater than x. Comparing equation (39) with equation (5), with the aid of downlink beamforming, two different channels have been artificially generated, which are space-time decoded to recover the transmitted signal. Permutation decoding methods can be easily applied if $S_1(n;k)$ and $S_2(n;k)$ are chosen as follows.

|  | t = k | t = k + 1 |
|---|---|---|
| $S_1(n; t)$ | $s(n; k)/\sqrt{2}$ | $s^*(n; k + 1)/\sqrt{2}$ |
| $S_2(n; t)$ | $s(n; k + 1)/\sqrt{2}$ | $-s^*(n; k)/\sqrt{2}$ |

Conveniently, the transmit beamforming weights can be chosen by maximizing the average transmit SINR functions.

Preferably, the transmit beamforming weights can be chosen by maximizing the average receive SINR at the mobile receiver.

Advantageously, the transmit beamforming weights, $w_m$, can be chosen as the principal eigenvector of $R_{d,m}$.

As previously mentioned, there follows a comparison the spectrum efficiency of a OFDM system with different cyclic prefix lengths.

The parameters are Bandwidth B=800 kHz, maximum time delay=40. For HT models, the maximum delay spread for each clustered path is 5. To make the tones orthogonal to each other, the symbol duration is N/B, where N is the number of tones in each OFDM symbol. The total block length is the summation of the symbol duration and the additional guard interval, which is 40, 5, and 0 for OFDM without PAL, HT with PAL and TR with PAL, respectively.

Table I illustrates the uncoded transmit data rate for OFDM systems with different number of tones using QPSK modulation. It is seen that, for a given modulation scheme and with the same number of tones, the transmit data rate can increase to 1.6 Mbps for TR environments by using PAL, independent of the N value. For HT with PAL, the spectrum efficiency is also increased as compared with that without PAL.

TABLE I transmit data rate comparison

|  | N = 128 | N = 64 | N = 32 |
| --- | --- | --- | --- |
| Without PAL | 1.28 Mbps | 1.07 Mbps | 800 kbps |
| HT with PAL | 1.55 Mbps | 1.51 Mbps | 1.42 Mbps |
| TR with PAL | 1.6 Mbps | 1.6 Mbps | 1.6 Mbps |

Here follows a comparison of the power savings for OFDM with different lengths of cyclic prefix:

Due to the adding of a cyclic prefix, the effective $$\frac{E_b}{N_0}$$

is smaller than the actual transmit $$\frac{E_b}{N_0}.$$

With delay spread reduction, the transmit power is more efficiently used. Table II illustrates the power savings for OFDM systems with delay spread reduction using PAL for different number of tones in each OFDM block, as compared to normal OFDM systems.

TABLE II

Power savings

|  | N = 128 | N = 64 | N = 32 |
| --- | --- | --- | --- |
| HT with PAL | 0.84 dB | 1.5 dB | 2.5 dB |
| TR with PAL | 0.97 dB | 1.76 dB | 3.0 dB |

Beamforming and Diversity Gain:

With combined beamforning and diversity gain, it takes less $$\frac{E_b}{N_0}$$

in order for the system to achieve a given bit-error-rate (BER) requirement. Alternatively, the beamforming and diversity gain can be translated to larger spectrum efficiency using higher modulation scheme such as 128 QAM or 256 QAM.

Figure 9:
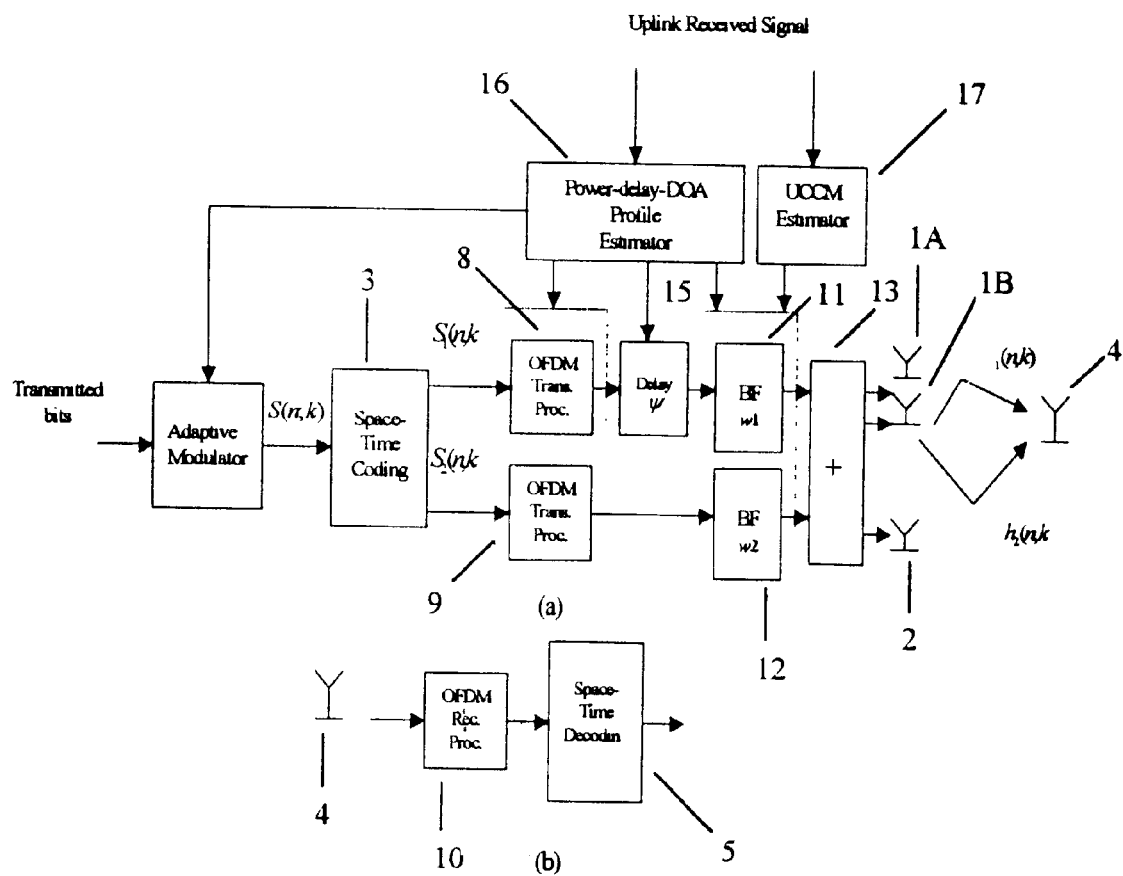
FIG. 9 is a schematic diagram illustrating a method embodying the present invention using OFDM with combined beamforming, transmit diversity and adaptive delay spread reduction: at (a) a transmitter; and (b) a receiver.

A further embodiment of the present invention relates to adaptive delay spread reduction with combined beamforming and diversity gain:

The previously described embodiments are designed for different environments. In real applications, the power-delay-DOA (PDD) profile may change with respect to time due to the motion of a vehicle, thus the delay spread reduction scheme should follow this variation accordingly in order to achieve maximum spectrum efficiency. FIG. 9 shows an OFDM system with combined beamforming, transmit diversity and adaptive delay spread reduction for downlink embodying the present invention. The OFDM system of FIG. 9 comprises the system of FIG. 8 but supplemented by UCCM estimation and power-delay-DOA profile estimation. Thus, in addition to the functionality provided by the system of FIG. 8, this system has the following functionality.

From uplink signals received at the base station, the time-delay and direction-of-arrival (DOA) information is estimated for each received path, using training sequences or blind techniques. Based on the estimated time-delay and DOA information, uplink power-delay-DOA (PDD) profile, and each clustered path's UCCM are estimated;

Based on uplink PDD profile, the following parameters are determined: diversity order, time delays for each clustered path, and the maximum delay spread for the clustered paths.

The uplink PDD profile is used to design the adaptive delay reduction scheme, thus the adaptive cyclic prefix adding scheme;

Each clustered path's DCCM is estimated from its corresponding UCCM using FC method disclosed in Y-C. Liang and F. Chin "Downlink beamforming methods for capacity enhancement in wireless communication systems", Singapore Patent Application No. 9904733.4, then applied, together with time delay information, for constructing transmit beamforming weights;

The base station informs the MS the length of added cyclic prefix;

Adaptive modulation is also used to further improve the spectrum efficiency based on the diversity order/channel condition. Specifically, based on uplink PDD profile, the maximum achievable diversity order is determined. If the achievable diversity order is large, a higher modulation scheme is applied; otherwise, a smaller modulation scheme is applied.

It should be noted that the number of branch outputs after space-time coding in module 3 can be greater than two, depending on the diversity order to be achieved.

The above description considers the combined beamforming, transmit diversity and delay spread reduction implemented at the base station. In fact, multiple diversity antennas can be added at the mobile terminal as well to achieve receive diversity. In this case, larger diversity gains can be achieved:

Even though OFDM is used to show how the delay spread can be reduced, while yet maintaining beamforming and transmit diversity gain, the disclosure in this application can be applied to other multi-carrier modulation schemes, such as MC-CDMA, MC-DS-CDMA and single carrier systems with cyclic prefix.

In a multiuser environment, the beamforming weights can be generated by considering all users' channel/DOA information; therefore, the disclosure in this application is applicable in different multiple access schemes, such as time-division-multiple-access (TDMA), frequency-division-multiple-access (FDMA), and code-division-multiple-access (CDMA).

"Comprising" Means "Including or Consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of achieving transmit diversity gain for frequency selective fading channels in a communication system that is a time-division duplex system and has a base station with multiple transmit antennae and a mobile terminal with at least a single receive antenna, the method comprising the steps of:
   providing a signal to be transmitted $s(n)$;
   space-time encoding the signal $s(n)$ to produce at least two separate signals $s_1(n), s_2(n)$, each on a respective output;
   feeding each output signal $s_1(n), s_2(n)$ to a zero-forcing pre-equaliser having a respective function $g_1(k)$, $g_2(k)$ to produce an output signal $x_1(n)$, $x_2(n)$;
   feeding the output signal $x_1(n)$, $x_2(n)$ of each pre-equaliser to a transmit antenna;
   transmitting the output signals $x_1(n)$, $x_2(n)$ over respective physical channels $h_1(k)$, $h_2(k)$;
   receiving the output signals $x_1(n)$, $x_2(n)$ at at least a single receive antenna; and
   space-time decoding the received signals, wherein
   the functions $g_1(k)$, $g_2(k)$ of the zero-forcing pre-equalisers are selected such that the channel responses $g_1(k)*h_1(k)$, $g_2(k)*h_2(k)$ of the respective physical channels $h_1(k)$, $h_2(k)$ are flat fading channels; and
   deriving real channel coefficients from uplinik channel coefficients for use in selecting the functions $g_1(k)$, $g_2(k)$ of the pre-equalisers.

2. A method according to claim 1, wherein the step of deriving the real channel coefficients from uplinik channel coefficients uses training symbols from the uplinik channel.

3. A method according to claim 1, wherein the step of deriving the real channel coefficients from uplinik channel coefficients uses blind techniques.

4. A method according to claim 1, wherein the communications system is a frequency-division duplex system and the method includes the further step of deriving the real channel coefficients by sending a set of training symbols to the receive antenna of the mobile terminal, the mobile terminal estimating the real channel coefficients and feeding back channel coefficient information to the base station.

5. A base station with multiple transmit antennae for communicating with a mobile terminal having at least a single receive antenna over physical channels $h_1(k)$, $h_2(k)$, the base station comprising:
   a space-time encoder having an input of a signal to be transmitted $s(n)$ and at least two outputs each producing a separate signal $s_1(n), s_2(n)$;
   at least two zero-forcing pre-equalisers, each fed by a respective output signal $s_1(n), s_2(n)$ and having a respective function $g_1(k)$, $g_2(k)$ to produce an output signal $x_1(n)$, $x_2(n)$, wherein real channel coefficients are derived from uplinik channel coefficients for use in selecting the functions $g_1(k)$, $g_2(k)$ of the pre-equalisers; and
   at least two transmit antennae, each being fed by the output signal $x_1(n)$, $x_2(n)$ of a respective one of the pre-equalisers, wherein the functions $g_1(k)$, $g_2(k)$ of the zero-forcing pre-equalisers are selected such that the channel responses $g_1(k)*h_1(k)$, $g_2(k)*h_2(k)$ of the respective physical channels $h_1(k)$, $h_2(k)$ are flat fading channels.

6. A communications system comprising the base station of claim 5 and a
   mobile terminal having at least a single receive antenna and a space-time decoder to decode the signals received from the base station.

7. A method of achieving combined beamforming and transmit diversity for frequency selective fading channels in a communication system having a base station with multiple transmit antennae and a mobile terminal with at least a single receive antenna, the method comprising the steps of:
   providing a signal to be transmitted $S(n;k)$;
   space-time encoding the signal $S(n;k)$ to produce at least two separate signals $S_1(n;k), S_2(n;k)$, each on a respective output;
   feeding each output signal $S_1(n;k), S_2(n;k)$ to a transmit processor to produce an output signal $X_1(n;k)$, $X_2(n;k)$;
   applying respective selected transmit beamforming weights to each output signal $X_1(n;k)$,
   feeding the respective weighted signals to a signal combiner to perform a summing function of the signals and produce a signal $X(n;k)$ for transmission;
   feeding the summed signal $X(n;k)$ to each of the multiple transmit antennae for transmission;
   transmitting the signals $X(n;k)$ over physical channel $h(n;k)$ wherein the physical channel $h(n;k)$ consists of two time-delayed rays, $h_1(n;k)$ and $h_2(n;k)$, with delay $\Delta\tau$;
   receiving the received signal $Y(n;k)$ at at least a single receive antenna;
   feeding the received signal $Y(n;k)$ to a receive processor to produce an output signal; and
   space-time decoding the received signal; wherein
   the transmit processors do not add cyclic prefixes and one of the output signals from the transmit processors is delayed by $\Delta\tau$ before the respective selected transmit beamforming weight is applied thereto.

8. A method according to claim 7, wherein the respective transmit beamforming weights are selected as the eigenvectors corresponding to the two largest eigenvalues of the downlinik channel covariance matrix (DCCM) of the physical channels $h(n;k)$.

9. A method of achieving combined beamforming and transmit diversity for frequency selective fading channels in a communication system having a base station with multiple transmit antennae and a mobile terminal with at least a single receive antenna, the method comprising the steps of:
   providing a signal to be transmitted $S(n,k)$;
   space-time encoding the signal $S(n,k)$ to produce at least two separate signals $S_1(n;k), S_2(n;k)$, each on a respective output;
   feeding each output signal $S_1(n;k), S_2(n;k)$ to a transmit processor to produce an output signal $X_1(n,k)$, $X_2(n;k)$;
   applying respective selected transmit beamforming weights to each output signal $X_1(n,k)$, $X_2(n;k)$;
   feeding the respective weighted signals to a signal combiner to perform a summing function of the signals and produce a signal $X(n;k)$ for transmission;
   feeding the summed signal $X(n;k)$ to each of the multiple transmit antennae for transmission;
   transmitting the signals $X(n;k)$ over physical channel $h(n;k)$;
   receiving the received signal $Y(n;k)$ at at least a single receive antenna;

feeding the received signal Y(n;k) to a receive processor to produce an output signal; and space-time decoding the received signal;

wherein the physical channel h(n;k) consists of two time-delayed rays, $h_1(n;k)$ and $h_2(n;k)$, with delay $\Delta\tau$, the beamforming weights being chosen such that the delayed signal or its inverse fast Fourier transform (IFFT) only goes through one channel $h_1(n;k)$ between the base station multiple transmit antennae and the receive antenna, whilst the undelayed signal or its IFFT only goes through another channel $h_2(n;k)$ between the base station multiple transmit antennae and the receive antenna, thereby creating two different channels which can be space-time decoded to recover the transmitted signal.

10. A method according to claim 7, wherein the physical channel h(n;k) consists of two time-delayed rays, $h_1(n;k)$ and $h_2(n;k)$, with delay $\Delta\tau$, the beamforming weights being chosen such that the average transmit SINR function at the base station is maximized for each ray.

11. A method according to claim 7, wherein the physical channel h(n;k) consists of two time-delayed rays, $h_1(n;k)$ and $h_2(n;k)$, with delay $\Delta\tau$, the beamforming weights being chosen such that the average receive SINR function at the mobile terminal is maximized.

12. A method according to claim 9, wherein the respective transmit beamforming weights are selected as the eigenvectors corresponding to the two largest eigenvalues of the downlinik channel covariance matrix (DCCM) of the physical channels h(n;k).

13. A method according to claim 7, wherein the physical channel h(n;k) consists of two time-delayed rays, $h_1(n;k)$ and $h_2(n;k)$, with delay $\Delta\tau$, the beamforming weights for each ray are chosen as the principal eigenvector of the downlinik channel covariance matrix (DCCM) corresponding to that ray.

14. A method of achieving combined beamforming and transmit diversity for frequency selective fading channels in a communication system having a base station with multiple transmit antennae and a mobile terminal with at least a single receive antenna, the method comprising the steps of:
providing a signal to be transmitted S(n;k);
space-time encoding the signal S(n,k) to produce at least two separate signals $S_1(n;k),S_2(n;k)$, each on a respective output;
feeding each output signal $S_1(n;k),S_2(n;k)$ to a transmit processor to produce an output signal $X_1(n,k)$, $X_2(n;k)$;
applying respective selected transmit beamforming weights to each output signal $X_1(n,k)$, $X_2(n;k)$;
feeding the respective weighted signals to a signal combiner to perform a summing function of the signals and produce a signal X(n;k) for transmission;
feeding the summed signal X(n;k) to each of the multiple transmit antennae for transmission;
transmitting the signals X(n;k) over physical channel h(n;k);
receiving the received signal Y(n;k) at at least a single receive antenna;
feeding the received signal Y(n;k) to a receive processor to produce an output signal; and
space-time decoding the received signal
wherein the physical channel h(n;k) consists of two time-delayed clustered rays, $h_1(n;k)$ and $h_2(n;k)$, with delay $\psi$, and maximum excess delay for the clusters $\Delta\psi$, the transmit processors have a cyclic prefix length of $\Delta\psi$ and one of the output signals from the transmit processors is delayed by $\psi$ before the respective selected transmit beamforming weight is applied thereto.

15. A method according to claim 14, wherein the respective transmit beamforming weights are selected as the eigenvectors corresponding to the two largest eigenvalues of the downlinik channel covariance matrix (DCCM) of the physical channels h(n;k).

16. A method according to claim 14, wherein the beamforming weights are chosen such that the delayed signal or its inverse fast Fourier transform (IFFT) only goes through one channel $h_1(n;k)$ between the base station multiple transmit antennae and the receive antenna, whilst the undelayed signal or its IFFT only goes through another channel $h_2(n;k)$ between the base station multiple transmit antennae and the receive antenna, thereby creating two different channels which can be space-time decoded to recover the transmitted signal.

17. A method according to claim 14, wherein the beamforming weights being chosen such that the average transmit SINR function at the base station is maximized for each clustered ray.

18. A method according to claim 14, wherein the beamforming weights being chosen such that the average receive SINR function at the mobile terminal is maximized.

19. A method according to claim 14, wherein the beamforming weights for each clustered ray are chosen as the principal eigenvector of the downlinik channel covariance matrix (DCCM) corresponding to that clustered ray.

20. A method according to claim 14, comprising the further steps of: estimating a power-delay-DOA profile for channel h(n;k); and, based on the profile: determining the cyclic prefix, $\Delta\psi$, to be added by the transmit processors; determining the delay $\psi$; diversity order and modulation scheme; and determining the transmit beamforming weights.

21. A method according to claim 20, comprising the further step of estimating the downlinik channel covariance matrix (DCCM) from the uplinik channel covariance matrix (UCCM) to construct transmit beamforming weights.

22. A method according to claim 21, comprising the further step of determining the diversity order and modulation scheme based on the profile.

23. A method according to claim 7, wherein the transmit and receive processors are selected from the group consisting of: OFDM, MC-CDMA MC-DS-CDMA and a single carrier system with cyclic prefix.

24. A base station with multiple transmit antennae for communicating with a mobile terminal having at least a single receive antenna over physical channel h(k), the base station comprising:
a space-time encoder having an input of a signal to be transmitted and at least two outputs each producing a separate signal;
at least two transmit processors each receiving one of the outputs from a respective space-time encoder;
at least two transmit beamformers each receiving an output from a respective transmit processor and applying a transmit beamforming weight thereto;
a signal combiner receiving signals from the beamformers and operable to perform a summing function of the signals from the beamformers and produce a signal for transmission by the multiple transmit antennae;
wherein the physical channel h(n;k) consists of two time-delayed rays, $h_1(n;k)$ and $h_2(n;k)$, with delay $\Delta\tau$, further comprising a delay of $\Delta\tau$ interposed between one of the multiple access transmit processor outputs and a beamformer to delay the signal output from the transmit processor by Δτ before the respective selected transmit beamforming weight is applied thereto, wherein the transmit processors do not add cyclic prefixes.

25. A base station with multiple transmit antennae for communicating with a mobile terminal having at least a single receive antenna over physical channel h(k), the base station comprising:
a space-time encoder having an input of a signal to be transmitted and at least two outputs each producing a separate signal;
at least two transmit processors each receiving one of the outputs from a respective space-time encoder;
at least two transmit beamformers each receiving an output from a respective transmit processor and applying a transmit beamforming weight thereto;
a signal combiner receiving signals from the beamformers and operable to perform a summing function of the signals from the beamformers and produce a signal for transmission by the multiple transmit antennae;
wherein the physical channel h(n;k) consists of two time-delayed clustered rays, $h_1(n;k)$ and $h_2(n;k)$, with delay ψ, and maximum excess delay for the clusters Δψ, further comprising a delay of ψ interposed between one of the multiple access transmit processor outputs and a beamformer to delay the signal output from the transmit processor by ψ before the respective selected transmit beamforming weight is applied thereto, the transmit processors having a cyclic prefix length of Δψ.

26. A communications system comprising the base station of claim 25 and a
mobile terminal having at least a single receive antenna, a receive processor to produce an output signal and a space-time decoder to decode the output signal.

27. A base station with multiple transmit antennae for communicating with a mobile terminal having at least a single receive antenna over physical channel h(k), the base station comprising:
a space-time encoder having an input of a signal to be transmitted and at least two outputs each producing a separate signal;
at least two transmit processors each receiving one of the outputs from a respective space-time encoder;
at least two transmit beamformers each receiving an output from a respective transmit processor and applying a transmit beamforming weight thereto;
a signal combiner receiving signals from the beamformers and operable to perform a summing function of the signals from the beamformers and produce a signal for transmission by the multiple transmit antennae; and
a first processor to determine a power-delay-DOA profile estimate for channel h(n;k); and, based on the profile, determine: the length, Δψ, of the cyclic prefix to be added by the transmit processors; the delay ψ; diversity order and modulation scheme; and the transmit beamforming weights.

28. A communications system comprising the base station of claim 27 and a
mobile terminal having at least a single receive antenna, a receive processor to produce an output signal and a space-time decoder to decode the output signal.

29. A base station according to claim 27, further comprising a second processor to estimate a downlink channel covariance matrix (DCCM) from the uplinik channel covariance matrix (UCCM) to construct transmit beamforming weights.

30. A base station according to claim 14, wherein the transmit and receive processors are selected from the group consisting of: OFDM, MC-CDMA MC-DS-CDMA and single carrier system with cyclic prefix.

31. A communications system comprising the base station of claim 24 and a
mobile terminal having at least a single receive antenna, a receive processor to produce an output signal and a space-time decoder to decode the output signal.

32. A method of achieving combined beamforming and transmit diversity for frequency selective fading channels in a communication system having a base station with multiple transmit antennae and a mobile terminal with at least a single receive antenna, the method comprising the steps of:
providing a signal to be transmitted s(n);
space-time encoding a signal to be transmitted s(n) to produce at least two separate signals $s_1(n),s_2(n)$, each on a respective output;
delaying one of the space-time encoded output signals by Δτ;
applying respective selected transmit beamforming weights to the delayed and undelayed signals;
feeding the respective weighted signals to a signal combiner to perform a summing
function of the signals and produce a signal for transmission;
feeding the summed signal to each of the multiple transmit antennae for transmission;
transmitting the summed signals over the physical channel h(k);
receiving the major components of the transmitted signals at at least a single receive antenna at substantially the same time; and
space-time decoding the received signal;
wherein the physical channel h(k) consists of two time-delayed rays $h_1(k)$, $h_2(k)$ with delay Δτ, the beamforming weights are chosen such that the delayed signal only goes through one ray $h_1(k)$ between the base station multiple transmit antennae and the receive antenna, whilst the undelayed signal only goes through another ray $h_2(k)$ between the base station multiple transmit antennae and the receive antenna.

33. A method of achieving combined beamforming and transmit diversity for frequency selective fading channels in a communication system having a base station with multiple transmit antennae and a mobile terminal with at least a single receive antenna, the method comprising the steps of:
providing a signal to be transmitted s(n);
space-time encoding a signal to be transmitted s(n) to produce at least two separate signals $s_1(n),s_2(n)$, each on a respective output;
delaying one of the space-time encoded output signals by Δτ;
applying respective selected transmit beamforming weights to the delayed and undelayed signals;
feeding the respective weighted signals to a signal combiner to perform a summing function of the signals and produce a signal for transmission;
feeding the summed signal to each of the multiple transmit antennae for transmission;
transmitting the summed signals over the physical channel h(k);
receiving the major components of the transmitted signals at at least a single receive antenna at substantially the same time; and
space-time decoding the received signal
wherein the physical channel h(k) consists of multiple rays with two major rays $h_1(k)$, $h_2(k)$ delayed by Δτ, the beamforming weights are chosen such that the delayed signal only goes through one ray $h_1(k)$ between the base station multiple transmit antennae and the receive antenna, whilst the undelayed signal only goes through another ray $h_2(k)$ between the base station multiple transmit antennae and the receive antenna.

34. A base station with multiple transmit antennae for communicating with a mobile terminal having at least a single receive antenna over physical channel $h(k)$ having two time-delayed rays, $h_1(k)$ and $h_2(k)$, the base station comprising:
- a space-time encoder having an input of a signal to be transmitted and at least two outputs each producing a separate signal;
- at least two transmit beamformers each receiving an output from the space-time encoder and applying a transmit beamforming weight thereto;
- a signal combiner receiving signals from the beamformers and operable to perform a summing function of the signals from the beamformers and produce a signal for transmission by each of the multiple transmit antennae, wherein a delay of $\Delta\tau$ is interposed between the space-time encoder and one of the beamformers such that the major components of the transmitted signals are received at at least a single receive antenna at substantially the same time.

35. A communications system comprising the base station of claim 24 and a
mobile terminal having at least a single receive antenna and a space-time decoder to decode the received signal.

* * * * *